(12) United States Patent
Osada

(10) Patent No.: US 7,492,444 B2
(45) Date of Patent: Feb. 17, 2009

(54) ELECTRIC OPTICAL DISTANCE METER

(75) Inventor: Futoshi Osada, Kanagawa (JP)

(73) Assignee: Sokkia Co., Ltd., Kanagawa (JP)

( * ) Notice: Subject to any disclaimer, the term of this patent is extended or adjusted under 35 U.S.C. 154(b) by 0 days.

(21) Appl. No.: 11/969,063

(22) Filed: Jan. 3, 2008

(65) Prior Publication Data

US 2008/0231830 A1  Sep. 25, 2008

(30) Foreign Application Priority Data

Mar. 22, 2007  (JP)  ............................. 2007-074009

(51) Int. Cl.
*G01C 3/08* (2006.01)
(52) U.S. Cl. .................................... 356/4.07
(58) Field of Classification Search ....... 356/3.01–3.15, 356/4.01–4.1, 5.01–5.15, 6–22, 28, 28.5, 356/139.01–139.1
See application file for complete search history.

(56) References Cited

U.S. PATENT DOCUMENTS 4,636,068 A *  1/1987  Niiho et al. ................ 356/5.13
5,886,777 A *  3/1999  Hirunuma ................... 356/5.12
2003/0020895 A1 *  1/2003  Bridges ....................... 356/4.01
2004/0246461 A1 *  12/2004  Ohtomo et al. ............ 356/4.01

FOREIGN PATENT DOCUMENTS

JP            8-226969 A       9/1996

\* cited by examiner

*Primary Examiner*—Thomas H Tarcza
*Assistant Examiner*—Luke D Ratcliffe
(74) *Attorney, Agent, or Firm*—Roberts Mlotokowski Safran & Cole, P.C.; Thomas W. Cole

(57) ABSTRACT

An electric optical distance meter is provided that makes an input power level of a reference light entering a light receiving device via an internal optical path comparable between low and high reflectivity targets. The electric optical distance meter has a shutter 50 for switching between an external optical path Po, through which a distance measuring light emitted by a light source is placed to and from a target, and the internal optical path Pi is placed from the light source to the light receiving device, where the shutter has: a rotating axis 55; blocking plates 56 which are arranged at two locations symmetric with respect to the rotating axis, and alternately block the respective distance measuring lights L entering the external optical path and the internal optical path; and an attenuation plate 57 which is placed at one of the two locations where the blocking plates are not arranged and between the blocking plates, and attenuates the distance measuring light entering the internal optical path when the target is of a low reflectivity.

3 Claims, 4 Drawing Sheets

(A)

(B)

(C)

ELECTRIC OPTICAL DISTANCE METER

FIELD OF THE INVENTION

The present invention relates to an electric optical distance meter. In more detail, the present invention relates to a shutter for switching between an external optical path, through which a distance measuring light emitted from a light source of the electric optical distance meter passes to and from a target (prism, reflection sheet, wall, or the like), and an internal optical path, which guides the distance measuring light from the light source directly to a light receiving device.

BACKGROUND OF THE INVENTION

A reference patent document 1 given below is known as an example of an electric optical distance meter. An optical path diagram of the electric optical distance meter disclosed in the reference patent document 1 is shown in FIG. 4.

In the electric optical distance meter, a distance measuring light (light pulse) L emitted from a light source 1 of a laser diode or the like is emitted through a light transmitting optical system composed of a condenser lens 2, an optical fiber 8, a prism 9, an object lens 10 and the like to a corner cube (prism) 11 placed on a measurement point. The light source 1 is connected to an unillustrated modulator, the modulator is connected to an unillustrated reference signal oscillator, and the distance measuring light L is modulated by a reference signal generated by the reference signal oscillator.

The distance measuring light L reflected by the corner cube 11 passes through a light receiving optical system composed of the object lens 10, the prism 9, a optical fiber 8A, a condenser lens 3, and the like, and enters a light receiving device 7 such as APD (avalanche photodiode). Then, the distance measuring light is converted into a distance measuring signal (electric signal) by the light receiving device 7. A phase difference between the distance measuring signal and a reference signal sent from the modulator is measured, and a distance to the corner cube 11 is obtained from the phase difference.

Incidentally, a split prism 4A and an optical path switching device 5 are inserted between the optical fiber 8 together with a light emitting side and the prism 9, and a split prism 4B is inserted between the prism 9 and the optical fiber 8A together with a light receiving side. The distance measuring light L is divided and sent into an external optical path Po going to the corner cube 11 and an internal optical path Pi going from the light transmitting optical system via the inside of the electric optical distance meter to the light receiving optical system by the split prisms 4A and 4B.

As shown in FIG. 5, the optical path switching device 5 blocks or passes the distance measuring light L going to the internal optical path Pi and the external optical path Po by rotating an optical path switching plate 5C having a blocking plate 5B stuck on a transparent disk 5A, to switch between the internal optical path Pi and the external optical path Po. An unillustrated pulse motor rotates the optical path switching plate 5C. An optical path detector 5D detects that the blocking plate 5B is at either position of the internal optical path Pi and the external optical path Po, that is, a shutter position.

When distance measurement by means of a phase difference is made by using the distance measuring light having passed through the internal optical path Pi (hereinafter this distance measuring light is referred to as reference light R), in the same manner as the distance measuring light L having passed through the external optical path Po, an error specific to the electric optical distance meter can be known. In this way, the distance measurement using the distance measuring light L having passed through the external optical path Po and the distance measurement using the reference light R having passed through the internal optical path Pi are repeated alternately a plurality of times, and the electric optical distance meter corrects the error specific to the electric optical distance meter from a distance measured by using the distance measuring light L having passed through the external optical path Po, and can provide an accurate distance to the corner cube 11.

[Patent Document 1] Japanese Published Unexamined Patent Application No. H08-226969

DISCLOSURE OF THE INVENTION

Problems to be Solved by the Invention

The electric optical distance meter not only makes distance measurement using the distance measuring light L reflected from a high reflectivity target such as a prism but also makes distance measurement using the distance measuring light L reflected from a low reflectivity target (object) such as a wall. When an output power of a light source 1 is increased so that sufficient distance measuring light L for obtaining a measured value with high accuracy returns even in a case that a low reflectivity target is used, the distance measuring light L becomes too strong for a case that a high reflectivity target is used. It is known that an error (cyclic error) occurs when the distance measuring light L irradiates a position out of the center of a prism in the case that the distance measuring light L is too strong. To avoid such an error, a conventional electric optical distance meter uses the light source 1 with the output power decreased in the case of using the high-reflectivity target However, since the internal optical path Pi is common to even the case that the low reflectivity target is used and even the case that the high reflectivity target is used, if the output power of the light source 1 is greatly decreased in the case that the high reflectivity target is used, then an input power level of the reference light R having passed through the internal optical path Pi and entering the light receiving device 7 becomes extremely low in comparison with the case that the low reflectivity target is used, and it is a problem that accurate distance measurement cannot be made.

In view of the problem mentioned above, the present invention of an electric optical distance meter takes up an object to make an input power level of a reference light entering a light receiving device via an internal optical path comparable between even cases that the low reflectivity target is used and the high reflectivity target is used.

Means for Solving the Problem

To solve the above problem, an electric optical distance meter of an invention according to claim 1 includes: a light source for emitting a distance measuring light to a target placed on a measurement point; a light receiving device for receiving the distance measuring light reflected and returned from the target; a dividing means for dividing the distance measuring light emitted by the light source between an external optical path placed to and from the target and an internal optical path placed from the light source to the light receiving device; and a shutter for switching between the internal optical path and the external optical path; where the shutter has: a rotating axis; blocking plates which are arranged at two locations symmetric with respect to the rotating axis, and alternately block the respective distance measuring lights entering the external optical path and the internal optical path; and an attenuation plate which is placed at one of the two locations where the blocking plates are not arranged and between the blocking plates, and attenuates the distance measuring light entering the internal optical path when the target is of a low reflectivity.

An electric optical distance meter of an invention according to claim 2 has a blocking plate and an attenuation plate in the invention according to claim 1, where the blocking plate and the attenuation plate are in a fan shape having a central angle of 90°.

An electric optical distance meter of an invention according to claim 3 has a shutter position detector on the periphery of the attenuation plate in the invention according to claim 2.

EFFECTS OF THE INVENTION

An electric optical distance meter of the invention according to clime 1 has: a shutter which switches a distance measuring light to an external optical path or an internal optical path; a rotating axis; blocking plates which are arranged at two locations symmetric with respect to the rotating axis, and alternately block the respective distance measuring lights entering the external optical path and the internal optical path; and an attenuation plate which is placed at one of the two locations where the blocking plates are not arranged and between the blocking plates, and attenuates the distance measuring light entering the internal optical path when a target is of a low reflectivity. This allows the distance measuring light to enter the internal optical path after the distance measuring light is passed through the attenuation plate and is attenuated when the low reflectivity target is used. In addition, this allows the distance measuring light to enter the internal optical path through a portion where not only the blocking plate but also the attenuation plate does not exist without the distance measuring light being attenuated when the high reflectivity target is used. In this way, the strength of the reference light entering the light receiving device through the internal optical path can be made comparable between the case that the low reflectivity target is used and the output of the light source is maximum and the case that the high reflectivity target is used and the output of the light source is reduced greatly. Therefore, since the output of the light source can be increased so as for sufficient distance measuring light to return even in the case that the low reflectivity target is used, and can be reduced greatly in the case that the high reflectivity target is used, the present invention can provide a measurement with fewer errors in the both cases.

Since the electric optical distance meter of the invention according to claim 2 uses the blocking plate and the attenuation plate in a fan shape having a central angle 90°, the shutter can be produced by fixing the top of the blocking plate to the rotating axis and bonding the respective sides of the attenuation plates to the blocking plates, so that production of the shutter becomes easy.

Furthermore, since the electric optical distance meter of the invention according to claim 3 uses the shutter position detector mounted on the periphery of the attenuation plate, the electric optical distance meter does not fail in discriminating the attenuation plate from the blocking plate and can reliably distinguish between the attenuation plate and the blocking plate, so that a measurement error becomes difficult to occur.

BRIEF DESCRIPTION OF THE DRAWING

FIG. [1] An optical path diagram of an electric optical distance meter according to a first embodiment of the present invention.

FIG. [2] A view to explain a shutter for switching a distance measuring light between an external optical path and an internal optical path in the electric optical distance meter.

FIG. [3] A view to explain a shutter of the electric optical distance meter according to the second embodiment of the present invention.

FIG. [4] An optical path diagram of a conventional electric optical distance meter.

FIG. [5] A figure to explain a shutter for switching a distance measuring light between an external optical path and an internal optical path in the conventional electric optical distance meter.

BEST MODE FOR CARRYING OUT THE INVENTION

Figure 1:
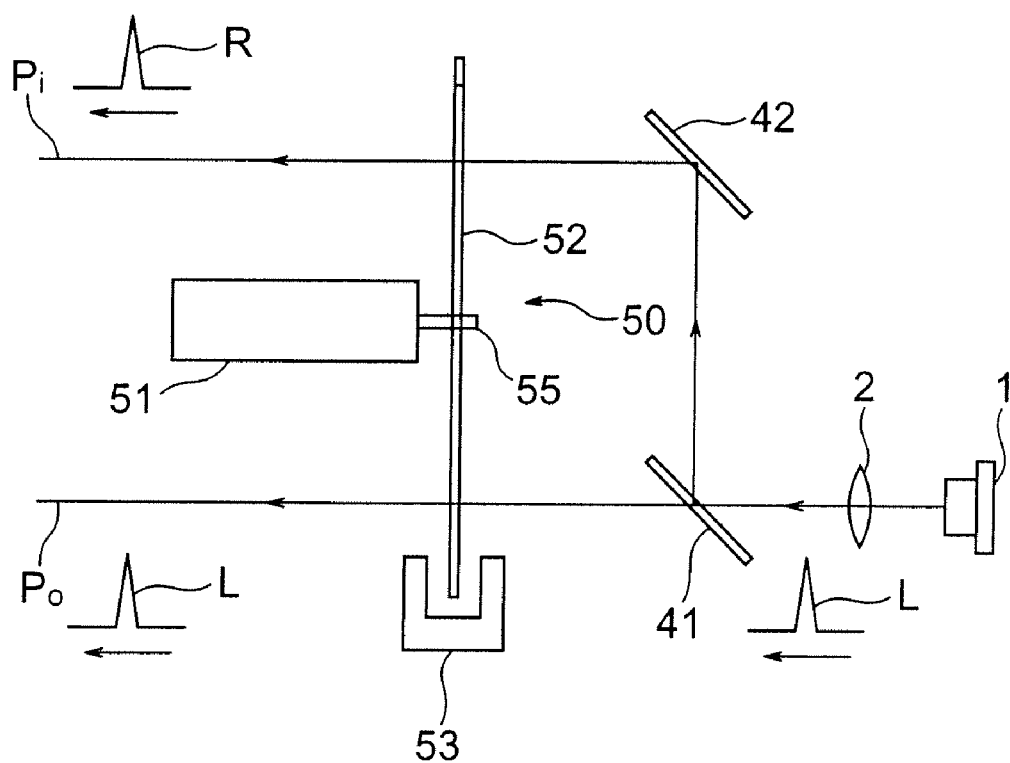
Figure 2:
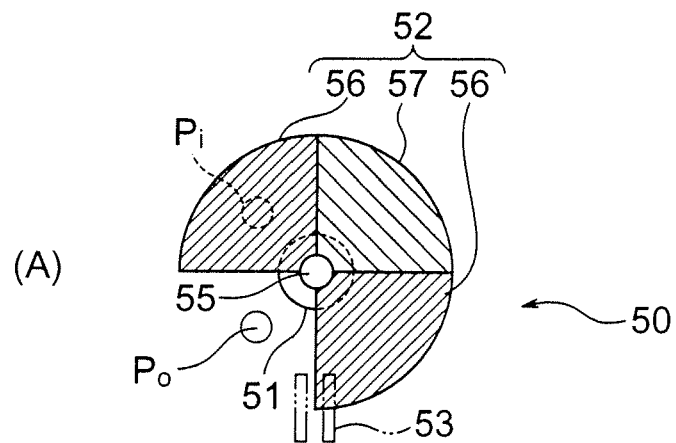
Figure 2:
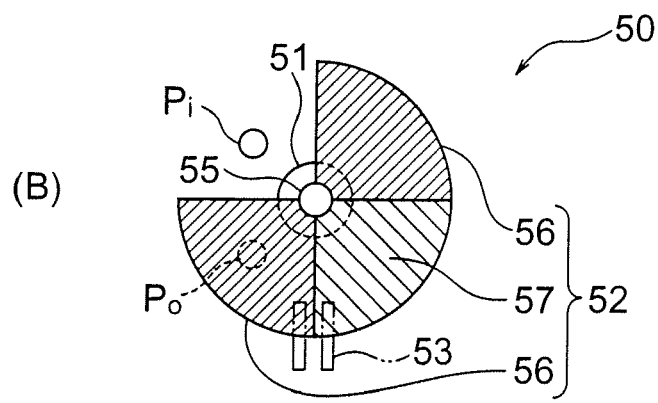
Figure 2:
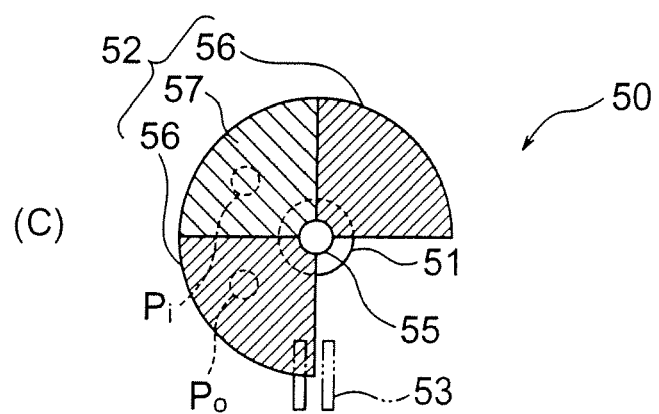

The following describes embodiments of an electric optical distance meter of the present invention with reference to the drawings. FIG. 1 is an optical path diagram illustrating the main part of an electric optical distance meter according to a first embodiment of the present invention. FIG. 2 is a figure to explain shutter operations of the electric optical distance meter.

As shown in FIG. 1, the electric optical distance meter has a light source 1 such as a laser diode for emitting a distance measuring light L. The distance measuring light L is divided between an external optical path Po where a light passes through a half mirror 41 and goes to a target such as an unillustrated prism and an internal optical path Pi where a light is reflected by the half mirror 41 and a total reflection mirror 42 and goes through the inside of the electric optical distance meter to an unillustrated light receiving device. A shutter (optical path switching device) 50 composed of a stepping motor 51 and an optical path switching plate 52 driven by the stepping motor 51 is used in order to switch between the external optical path Po and the internal optical path Pi.

As shown in FIG. 2, in the optical path switching plate 52 of the shutter 50: a disk is divided into four equal parts; blocking plates 56 coated with black, made of a metal, and in a fan shape having a central angle of 90° are arranged on two symmetric locations and fixed to a rotating axis 55 of the stepping motor 51; and an attenuation plate 57 for attenuating the distance measuring light L entering the internal optical path Pi is arranged on one of two locations, where the blocking plates 56 are not arranged. Of course, nothing is arranged on the other of the two locations, where the attenuation plate 57 is not arranged. The attenuation plate 57 is a uniformly gray-colored plastic film in a fan shape having a central angle of 90°, both side peripheries of the plastic film are fixed to the two blocking plates 56 by bonding, and the distance measuring light L can be attenuated to about 1/50 by the attenuation plate 57.

Positions of the blocking plate 56 and the attenuation plate 57 relative to the external optical path Po and the internal optical path Pi, that is shutter positions are detected by an optical path detector composed of a pair of photo-interrupters 53 and the like.

When the distance measuring light L enters the external optical path Po in a measurement mode, the optical path switching plate 52 is located at an initial position (rotation angle of 0°) shown in FIG. 2(A) even in the case that the low reflectivity target is used and in the case that the high reflectivity target is used. This makes the blocking plate 56 block an optical path to the internal optical path Pi and a part of the distance measuring light L enter the external optical path Po. Of course, an output of the light source 1 is further reduced in the same way as conventionally in the case that the high reflectivity target is used to lower voltages supplied to the light source 1 in comparison with the case that the low reflectivity target is used.

When the distance measuring light L enters the internal optical path Pi in a calibration mode, the optical path switching plate 52 is at different rotation angles between the case that the high reflectivity target is used and the case that the low reflectivity target is used, as described below.

In the case that the high reflectivity target is used, the optical path switching plate 52 is placed at a position rotating clockwise by 90° as shown in FIG. 2(B). This makes the blocking plate 56 block an optical path to the external optical path Po and the distance measuring light L not attenuated at all enter the internal optical path Pi. In the case that the low reflectivity target is used, the optical path switching plate 52 is placed at a position rotating counterclockwise by 90° (clockwise by 270°) from the initial position as shown in FIG. 2(C). This makes the blocking plate 56 block an optical path to the external optical path Po and a part of the distance measuring light L attenuated greatly by the attenuation plate 57 enter the internal optical path Pi. Of course, the output of the light source 1 is further reduced in the same way as the measurement mode in the case that the high reflectivity target is used than in the case that the low reflectivity target is used.

That is, in the case that the high reflectivity target is used, the electric optical distance meter performs distance measurement by switching between the state of FIG. 2(A) and the state of FIG. 2(B). In the case that the low reflectivity target is used, the electric optical distance meter performs the distance measurement by switching between the state of FIG. 2(A) and the state of FIG. 2(C).

When the shutter 50 as described above is used, a strength of the reference light R entering the light receiving device through the internal optical path Pi can be made comparable between the case that the low reflectivity target is used and the output of the light source 1 is at the maximum through the attenuation plate 57 and the case that the high reflectivity target is used and the output of the light source 1 is greatly reduced not via the attenuation plate 57. This can provide the measurement with fewer errors in even both cases that the high reflectivity target is used and that the low reflectivity target is used.

Figure 3:
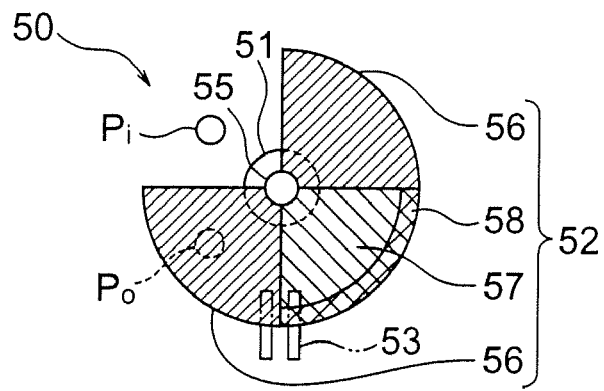
Figure 4:
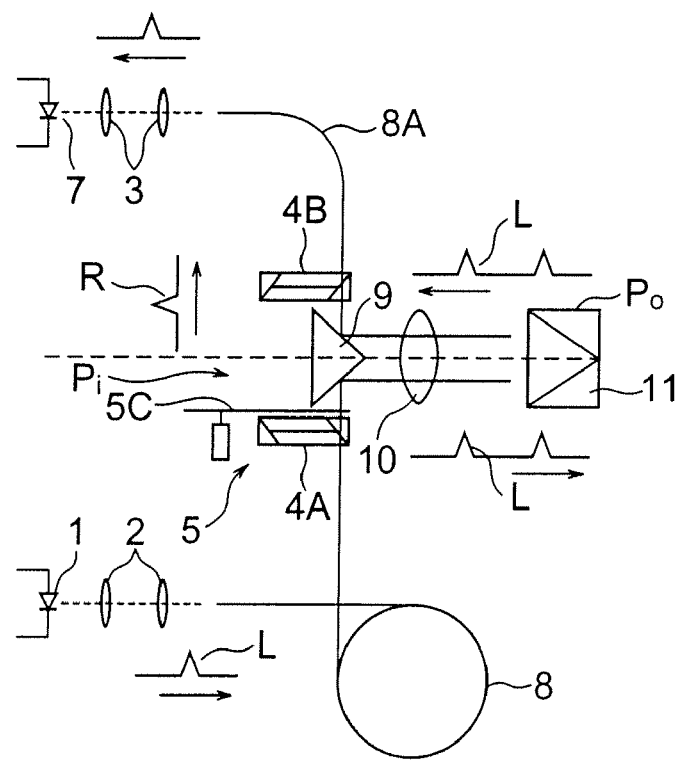
Figure 5:
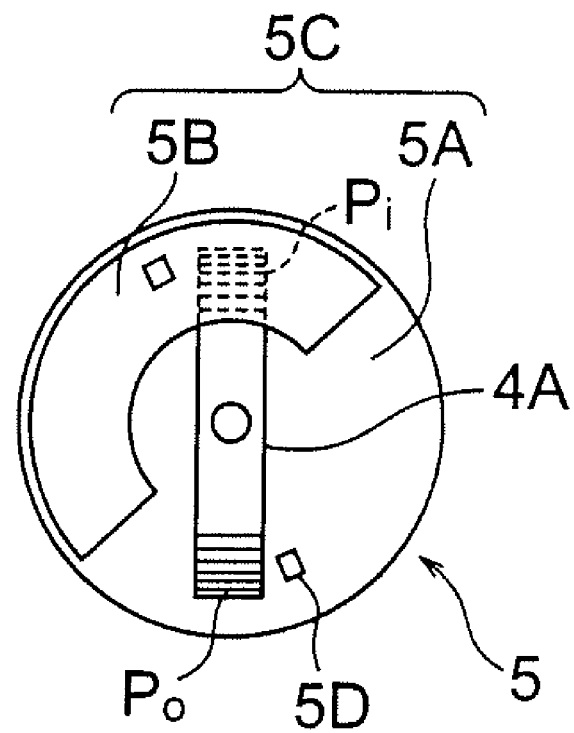

Next, a second embodiment of the present invention is described with respect to FIG. 3. An electric optical distance meter of the second embodiment has a shutter position detector 58 for detecting a rotational position of the optical path switching plate 52 on the periphery of the attenuation plate 57 of the optical path switching plate 52 of the electric optical distance meter according to the first embodiment. The shutter position detector 58 attenuates a light, but makes the light go through more easily than the attenuation plate 57, and works so that the electric optical distance meter never fails in discriminating the attenuation plate 57 from the blocking plate 56 when shutter position detection is performed by the photo-interrupters 53. This can make the electric optical distance meter of the embodiment detect the shutter position with reliability, and therefore hardly causes the electric optical distance meter to malfunction. Other constructions than this are the same as the first embodiment.

Incidentally, the present invention is not restricted only to the embodiments mentioned above, but also various modifications of the embodiments are available. For instance, the blocking plate 56 and the attenuation plate 57 need not be restricted to the fan shape having a center angle of 90°, and any shape that can block or attenuate the distance measuring light L entering the outer optical path Po and the inner optical path Pi can be properly chosen for the blocking plate 56 or the attenuation plate 57. Further, the photo-interrupters 53 need not be used to detect the shutter position. The electric optical distance meter stores the number of pulses sent to the stepping motor 51, and then determines the shutter position from the number of pulses. Such a method can be used for the optical path detector. Furthermore, a thing through which a light passes more easily than through the attenuation plate 57 although which attenuates the light need not be used as the shutter position detector 58, but a thing like the attenuation plate 57 on which a magnet detectable by a magnetic sensor is stuck can be used.

Description of the Symbols

1 Light source
50 Shutter
52 Optical path switching plate
53 Photo-interrupter (optical path detector)
56 Blocking plate
57 Attenuation plate
58 Shutter position detector
L Distance measuring light
R Reference light
Po External optical path
Pi Internal optical path

The invention claimed is:

1. An electric optical distance meter comprising:
a light source for emitting a distance measuring light to a target placed on a measurement point; a light receiving device for receiving the distance measuring light reflected and returned from the target; a dividing means for dividing the distance measuring light emitted by the light source between an external optical path placed to and from the target and an internal optical path placed from the light source to the light receiving device; and a shutter for switching between the internal optical path and the external optical path; wherein the shutter has: a rotating axis; blocking plates which are arranged at two locations symmetric with respect to the rotating axis and alternately block the respective distance measuring lights entering the external optical path and the internal optical path; and an attenuation plate which is placed at one of the two locations between the blocking plates and attenuates the distance measuring light entering the internal optical path when the target is of a low reflectivity.

2. The electric optical distance meter as defined in claim 1, wherein the blocking plates and the attenuation plate are in a fan shape having a central angle of 90°.

3. The electric optical distance meter as defined in claim 2, wherein a shutter position detector is mounted on the periphery of the attenuation plate.

* * * * *